J. KLINE.
SEWING-MACHINE JOURNAL.
No. 178,303. Patented June 6, 1876.
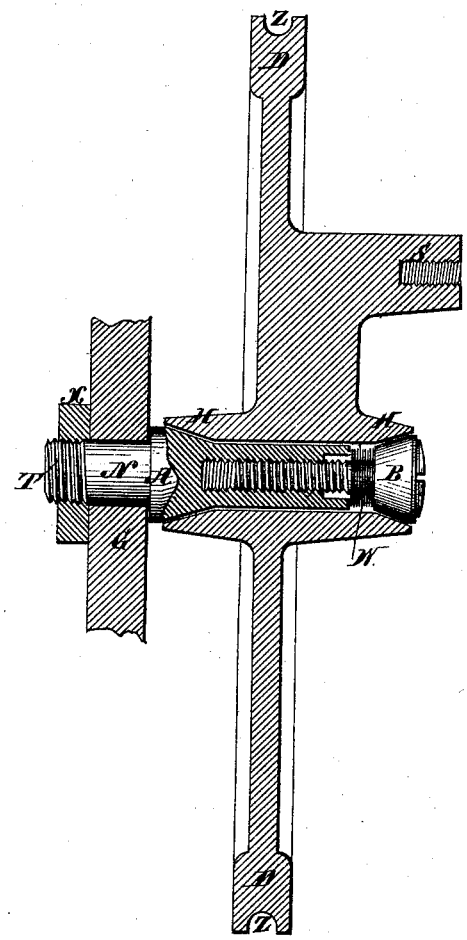
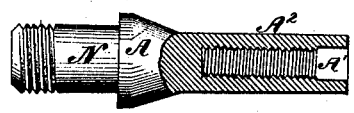
  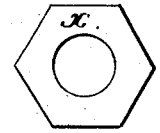
Witnesses.
Richard Nolan
Thomas Bradley
Inventor.
Jacob Kline
Per Theophilus Weaver.
His Atty.

UNITED STATES PATENT OFFICE.

JACOB KLINE, OF CAMP HILL, PENNSYLVANIA.

IMPROVEMENT IN SEWING-MACHINE JOURNALS.

Specification forming part of Letters Patent No. 178,303, dated June 6, 1876; application filed April 3, 1876.

*To all whom it may concern:*

Be it known that I, JACOB KLINE, of Camp Hill, county of Cumberland and State of Pennsylvania, have invented an Improvement in Sewing-Machine Journals, which improvement is fully set forth in the following specification, reference being had to the accompanying drawing, making a part of this specification, in which—

Figure 1 is a transverse section of a band-wheel of a sewing-machine, having my journal attached thereto. Fig. 2 is a view of the journal-stud proper. Fig. 3 is a view of the compensating set-screw. Fig. 4 represents a series of washers or fillers for the journal. Fig. 5 represents the usual lock-nut employed to attach the stud to the machine-frame.

My present invention is related to that class of journals known as "compensating-journals," which are specially designed to afford the means in themselves to take up the lost motion or wabble of the band-wheel, resulting in consequence of the worn state of both the journal-surfaces and the conical seats in the wheel-hub, its general construction and arrangement being such that a conical-headed set-screw, constituting the front bearing for the hub, may be set closer up to a stationary conical bearing at the rear end of said hub. Said set-screw is always set firmly to its place of duty. The distance it can be advanced before it sets or stops depends on the number and the thickness of fillers or washers on its stem at its head. When the journal is new and unworn, the conical heads are more distant from each other than subsequently, when the journal-surfaces have been worn. To set up or advance said set-screw, therefore, to compensate for wear, a surplus number of fillers are entered on the screw-stem when the device is new, one or more of which can be afterward removed, thus allowing the screw-head to advance farther before the screw is stopped by setting on the remaining fillers.

In the drawings, D H represent the band-wheel, having the conical seats H H in the ends of the hub. A B represent the conical bearings of the journal, the former being a shoulder or butt on the stud N A, which has the attaching-shank N, as shown, and the screw T on the end thereof, on which the nut X, which is a common lock-nut, is employed to connect the journal to the machine-stand G. The bearing B referred to is the conical head of the set-screw C C', (shown in Fig. 3,) which screws into the body of stud A N, as shown, suspending on its stem C the fillers W (shown in Fig. 4) as discous thin bodies.

It has been customary heretofore—on axles, for example—to add washers to set the skein up farther on the arm of the axle, the washers being interposed behind the usual nut. It is obvious my present device differs from the foregoing, in the fact that my fillers are employed to make the journal—that is, the axle-arm—longer or shorter, which is effected by addition to or subtraction from it of fillers, the depth of the tapped hole A', Fig. 2, being sufficiently deep to allow the set-screw B C to be entirely denuded or stripped of fillers, and set up with head B jammed directly against the front end of the stud A N.

When the journal is first fitted to the wheel a surplus length of journal is afforded by inserting several fillers on the set-screw, as stated; then, in course of time, as the wheel becomes loose and wabbly, one of the fillers may be removed, when, the set-screw being driven to its proper place, the wheel will run true again.

The retention of the fillers in the journal is a better method than to compensate by adding, for the reason that said devices are not liable to become lost, as would be the case were they laid by until needed.

The construction of the parts need not be specified, as they are clearly shown in the drawings, and have no novel features in form, except the peculiar form of the set-screw head, which is large compared with the stem thereof, and squarely formed at the inner end of the conical bearing thereon, to afford room on the said stem to locate and support the distancing-fillers on the said stem in such manner that when the fillers are on, and the sections of the journal applied to each other, the fillers may form a complement of the cylindrical body of the journal-arm $A^2$, as shown Fig. 1.

I do not limit the use of my improved journal to sewing-machines, as I am aware it can be employed on other machines, and also as a good wrist-pin.

Having thus fully and clearly described my invention, what I regard as new and useful, and what I desire to secure by Letters Patent, is embraced in the following:

I claim—

1. A sectional compensating-journal composed of two sections, each of which has a conical bearing, whose distance from each other is regulated by a variable quantity of fillers or washers interposed between the said sections, and supported on the set-screw stem, by which the bearings are connected, substantially as set forth.

2. The journal-sections A N and B C, connected together by the screw C C′, and incorporating one or more fillers, W, between them, as means to regulate the journal's length, in combination with a hub having the conical seats H H, and with the frame G, these parts being all arranged for operation substantially as set forth.

In testimony that I claim the foregoing as my invention, I have hereunto set my hand this 1st day of April, 1876.

JACOB KLINE.

Attest:
   THEOPHILUS WEAVER,
   PETER STUCKER.